June 27, 1961  S. SODERBERG ET AL  2,989,982
PRESSURE REDUCING VALVE
Filed July 15, 1958  2 Sheets-Sheet 1

INVENTORS
STEN SODERBERG
SIGGE SCHILLER
BY
Pennie, Edmonds, Morton, Barrows & Taylor
ATTORNEYS June 27, 1961  S. SODERBERG ET AL  2,989,982
PRESSURE REDUCING VALVE
Filed July 15, 1958  2 Sheets-Sheet 2

INVENTORS
STEN SODERBERG
SIGGE SCHILLER
BY
ATTORNEYS 2,989,982
PRESSURE REDUCING VALVE
Sten Soderberg, Nutley, and Sigge Schiller, Rutherford, N.J., assignors to Leslie Co., Lyndhurst, N.J., a corporation of New Jersey
Filed July 15, 1958, Ser. No. 748,623
2 Claims. (Cl. 137—505.22)

This invention relates to valves and more particularly to pressure reducing valves or pressure regulators.

In the present invention, we provide a self-contained reducing valve having high capacity regulation and which is unaffected by dirty steam or fluid. The valve is so constructed that it may be mechanically loaded with the load uniformly distributed over the surface of the diaphragm in substantially the same manner as in similar controls employing pneumatic or hydraulic loading. This permits the use of thin, super-flexible metal diaphragms which will function efficiently at high and low pressure. With such super-flexible diaphragms, they may be provided with backing to protect them against pressures higher than those normally encountered.

In present constructions of similar devices where the operating means is of a mechanical type, it generally consists of a spring, one end of which bears against the inside of its housing and the other end against a follower or diaphragm disc which, in turn, engages the diaphragm. The diaphragm disc is usually smaller than the diaphragm, and the diaphragm is thereby unprotected in the area beyond the periphery of the disc. Being subjected to pressure on one side only, it is thus highly stressed. The amount of deflection of the diaphragms used in such constructions is small, and the corresponding valve opening for permissible variation in the controlled pressure is likewise small. As a result, the capacity of such regulators is limited. Also the effective area of the diaphragm varies as the valve is moved from a closed to open position, and the controlled pressure thus drops faster with increased valve travel or flow.

The objections to the present forms of mechanically loaded pressure reducing valves may be partly overcome by loading the diaphragm with fluid pressure. The pressure is thus balanced over the entire diaphragm area. In many installations, however, a fluid operated valve is not feasible, and it is desirable to have a mechanically loaded, self-contained valve having an accuracy approaching that of the fluid operated valve.

In our invention we provide a super-flexible diaphragm secured at its edge and having means for uniformly applying a desired force over its entire surface. The diaphragm may be of the type shown in the United States patent to Sigge Schiller, No. 2,855,002, issued October 7, 1958. Such diaphragm is formed of light gauge metal and is provided with a plurality of depressions in its surface which provide excess metal to permit the diaphragm to travel with very small differential pressure on its surface and without a snap action.

Other forms of super-flexible diaphragms, if available, may also be used. The diaphragm may have one or more slotted discs arranged on top of it to uniformly transmit the load over the entire surface of the diaphragm.

The diaphragm is arranged in a suitable casing and connected to the stem of the main valve. The valve is biased toward closed position by a suitable spring, and the force applied to the diaphragm is relied upon to open the valve against the pressure of this spring and the pressure exerted on the underside of the diaphragm by the fluid in the system.

The loading means may be either spring means or weight-loading means, and may be of various forms, some of which are herein illustrated. We may also employ one of various means for uniformly distributing the load over the surface of the diaphragm. The distributing means may be hydraulic or mechanical or it may consist of suitable materials arranged on the diaphragm between it and a diaphragm disc to distribute the load over the surface of the diaphragm.

In the accompanying drawings, we have shown several embodiments of the invention. In this showing:

Figure 1:
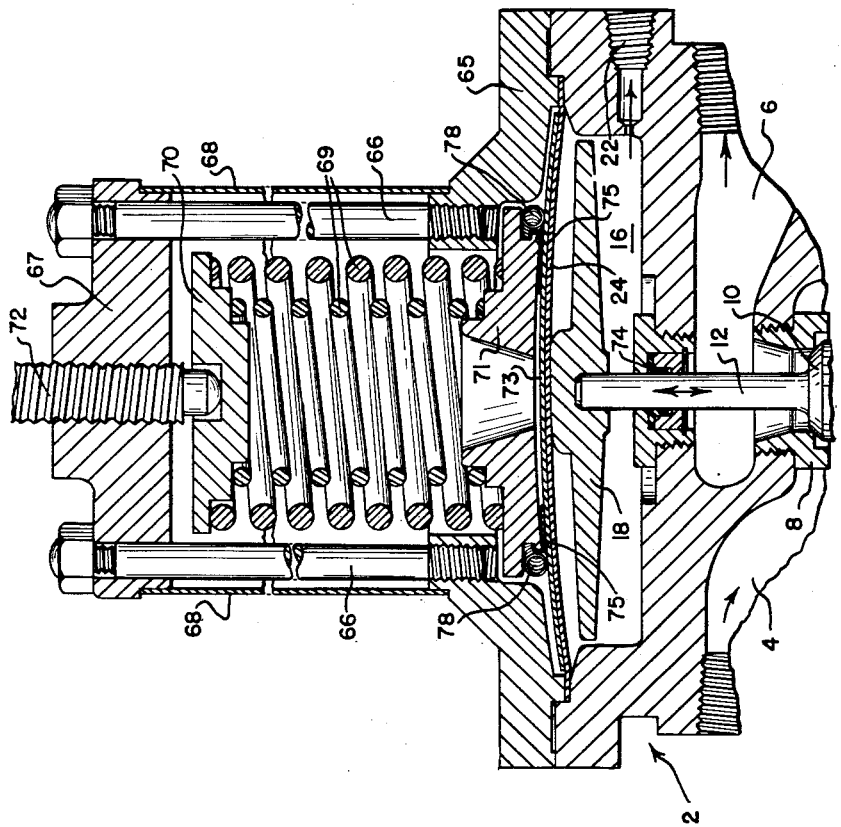
FIG. 1 is a vertical, sectional view of one form of valve embodying the invention.

Referring to FIG. 1 of the drawings, valve casing 2 is provided with an inlet side 4 and an outlet side 6. A valve seat 8 in the casing receives a valve member 10. The valve stem 12 on one side of the valve member is surrounded by a coil spring which biases the valve toward closed position.

On the outlet side of the valve member, stem 12 extends in diaphragm chamber 16 and is connected to diaphragm disc 18. The diaphragm chamber may conveniently be formed as shown as an integral part of the valve casing or it could be a separate casing into which the valve stem extends. The diaphragm chamber is provided with an opening 22 which is connected by suitable piping (not shown) to the downstream side of the system in which the valve is used.

The Schiller diaphragm 24 is clamped in place by a cap 65. This cap is provided with a central opening. The portion surrounding the opening is provided with threaded holes for the reception of bolts 66. These bolts are passed through openings in a cap 67 to clamp a cylinder 68 between caps 65 and 67. Cylinder 68 forms the spring housing. Spring 69 is arranged between upper spring seat 70 and lower spring seat 71. An adjusting screw 72, generally similar to adjusting screw 36, extends through cap 67.

A slotted disc 73 is loosely mounted on the diaphragm. The detailed construction of the slotted disc will be more fully set forth hereinafter. As shown, the lower face of lower spring seat is provided with a recess at its periphery. This recess receives a coil spring 78 the ends of which are joined to each other. Spring 78 rolls back and forth in engagement with disc 73. Clips 75, which will be described in detail hereafter, position the spring on the disc.

Figure 2:
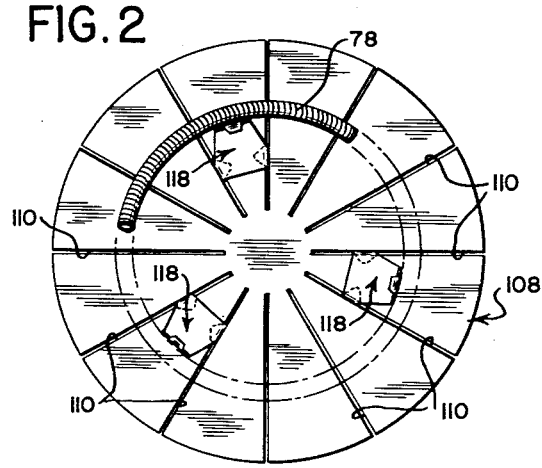
FIG. 2 is a plan view of one form of a disc used as a load distributing member and to protect the superflexible diaphragm.
Figure 3:
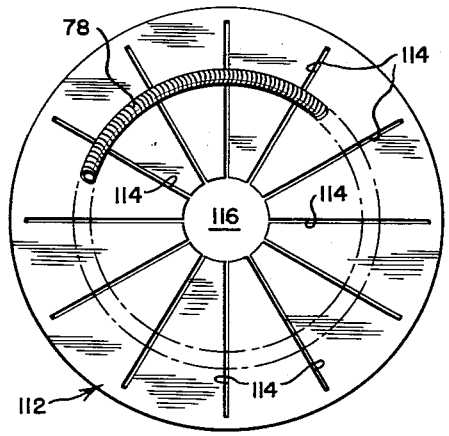
FIG. 3 is a similar view of another form of disc.

In FIGS. 2 and 3 we have shown two forms of load distributing discs that might be employed. Disc 108 of FIG. 2 is provided with a plurality of radial slots 110 extending from its edge and terminating a slight distance from the center. Coil spring 78 is illustrated in position on the disc. When the force exerted by the spring or other means is transmitted through spring 78 to disc 108, the sectors tend to move about the inner, narrow portions, the narrow portions serving as hinges. Outwardly of the hinge, the sector remains relatively rigid and transmits the force substantially evenly over the surface of the diaphragm. This permits the diaphragm to follow the approximate shape of the disc and protects the diaphragm from low to excessive pressures.

In FIG. 3 we have shown a disc 112 also provided with radial slots 114. The disc 112 is provided with a central opening 116 and the slots extend from this opening to a point close to the outer edge. Disc 112 functions similarly to disc 108 except that the hinge effect of the sectors is around the edge, instead of at the center.

Figure 4:
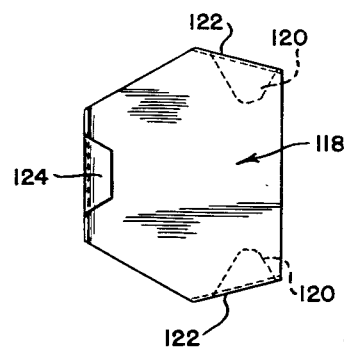
FIG. 4 is a detailed view of a spring clip used in connection with one form of the invention.

In FIG. 4 we have shown a clip 118 which may be used with either disc 108 or 112 to properly position spring 78. The clip is provided with engaging members 120 which extend downwardly from two side edges. As shown in FIG. 2, the edges 122 are arranged at the same angle to each other as slots 110. The engaging members are arranged in two adjacent slots with their end portions extending beneath the disc. At the outer end, the clip is provided with a member 124 extending upwardly from the body portion. A number of these clips may be mounted on either disc 108 or 112, and the members 124, extending above the disc, hold the spring 78 in place and limit its movement. The clips also locate and form a guide for the lower spring seat 71. We have found that the use of three clips is generally sufficient. The clips may be positioned, as desired, radially of the disc, but in practice we have found that the best results are obtained when they are arranged to position the spring 78 at the pressure center of the sectors.

The various forms of the invention herein disclosed produce a rugged, self-contained valve having an accuracy approaching that of valves controlled by a separate fluid operated control, and also provides a construction in which the travel of the main valve is a multiple of the movement of the loading means. The slotted portion of the disc 73 gives the appearance of radially-extending fingers. Inasmuch as the distance between the radial slots becomes progressively less as the slots extend inwardly from the periphery of the disc, the narrowest portion of each finger, and hence the portion of each finger most readily flexed, occurs at the inboard ends of the slots. Accordingly, pressure exerted against the disc 73 through the coil spring 78 causes a deflection of the disc 73 somewhat in the manner of a hinge, the flexing of the disc taking place predominantly at the innermost ends of the fingers with the peripheral ends of the fingers being fixedly supported on the top of the clamped periphery of the diaphragm. Thus, the action of the load spring 69 pressing against the disc 73 at the point of contact between the coil spring 78 and the disc, causes the inner portion of the disc to be deflected. This deflection of the disc 73 is characterized by a greater deflection at the center of the disc than at the intermediate portion thereof where the coil spring 78 acts. The flexible diaphragm conforms to the deflection of the disc and thus the action of the load spring 69, through the medium of the coil spring 78, the disc 73 and the diaphragm 75, is mechanically amplified at the point at which the center of the diaphragm makes contact with valve stem 12. This arrangement permits the use of a super-flexible diaphragm, which may be provided with suitable load-distributing discs, as described, which also protect it from excessive pressures.

Many modifications may be made in the detailed construction of the valve. The provision of means whereby the exerted force may be evenly distributed over the entire area of the diaphragm is one of the most important features of the invention. Another feature is the provision of means whereby travel of the valve is a multiple of the travel of the spring loading means, thereby increasing the capacity of the valve. The ratio by travel between the spring loading means and the valve can be further increased in some instances by providing means for changing the leverage between the loading means and the force transmitting means.

A Teflon seal 74 may be placed around the valve stem 12 in the opening in the member 20 to prevent leaking of fluid from the outlet side of the valve casing into the diaphragm chamber. When this seal is used, the force on the bottom of the diaphragm is that exerted by the valve biasing core spring and the downstream pressure if outlet 22 is connected downstream.

We claim:

1. In a valve structure including an inlet side and an outlet side with a flow path therebetween, valve means disposed in said path, a valve stem, and a thin flexible diaphragm mounted with a fixed peripheral portion and positioned to move the valve stem and thus move the valve, the improvement which comprises a loading means for the diaphragm including a casing, a spring mounted in the casing, a flexible diaphragm load-distributing and supporting disc of the same size as the free area of the diaphragm and engaging the diaphragm on the face thereof opposite the valve stem, the periphery of the disc thus being supported by the fixed peripheral portion of the diaphragm, the spring engaging the disc and thus exerting its force over the entire area of the diaphragm, the load-distributing disc being provided with a plurality of radial slots communicating with the peripheral portion thereof so as to define between the slots a plurality of relatively rigid fingers extending outwardly from the central portion of the disc so that the narrowest portion of each finger, and hence the most readily flexed portion of each finger, is located inboard of the periphery thereof, and spring load applicator means comprising an annular contact member arranged to transmit the spring pressure annularly to the pressure center of the disc.

2. A valve structure according to claim 1 in which the spring load applicator means comprises an annular coil spring positioned on the surface of the disc opposite the diaphragm and adjacent the pressure center of the disc, and a base plate inter-engaging the operative end of the spring and the annular coil spring.

References Cited in the file of this patent

UNITED STATES PATENTS

| | | |
|---|---|---|
| 1,079,600 | Kennedy | Nov. 25, 1913 |
| 2,195,242 | Dow | Mar. 26, 1940 |
| 2,264,306 | Grove | Dec. 2, 1941 |
| 2,342,659 | Grove | Feb. 29, 1944 |
| 2,650,455 | Jacobsson | Sept. 1, 1953 |
| 2,762,394 | Hastings | Sept. 11, 1956 |

FOREIGN PATENTS

| | | |
|---|---|---|
| 11,225 | Great Britain | of 1900 |